Oct. 30, 1934.                E. EHLERS                1,978,703
                               SLITTER
                      Filed Feb. 1, 1933        3 Sheets-Sheet 1

INVENTOR
Edward Ehlers,
BY
George D. Richards
ATTORNEY

Oct. 30, 1934.                E. EHLERS                1,978,703
                               SLITTER
                          Filed Feb. 1, 1933           3 Sheets-Sheet 2
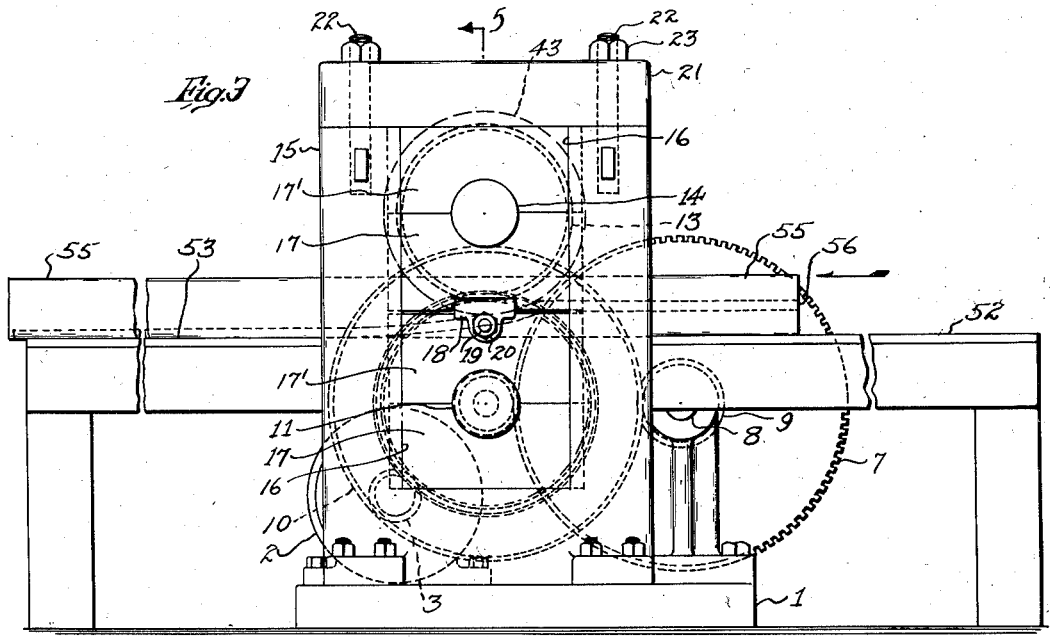
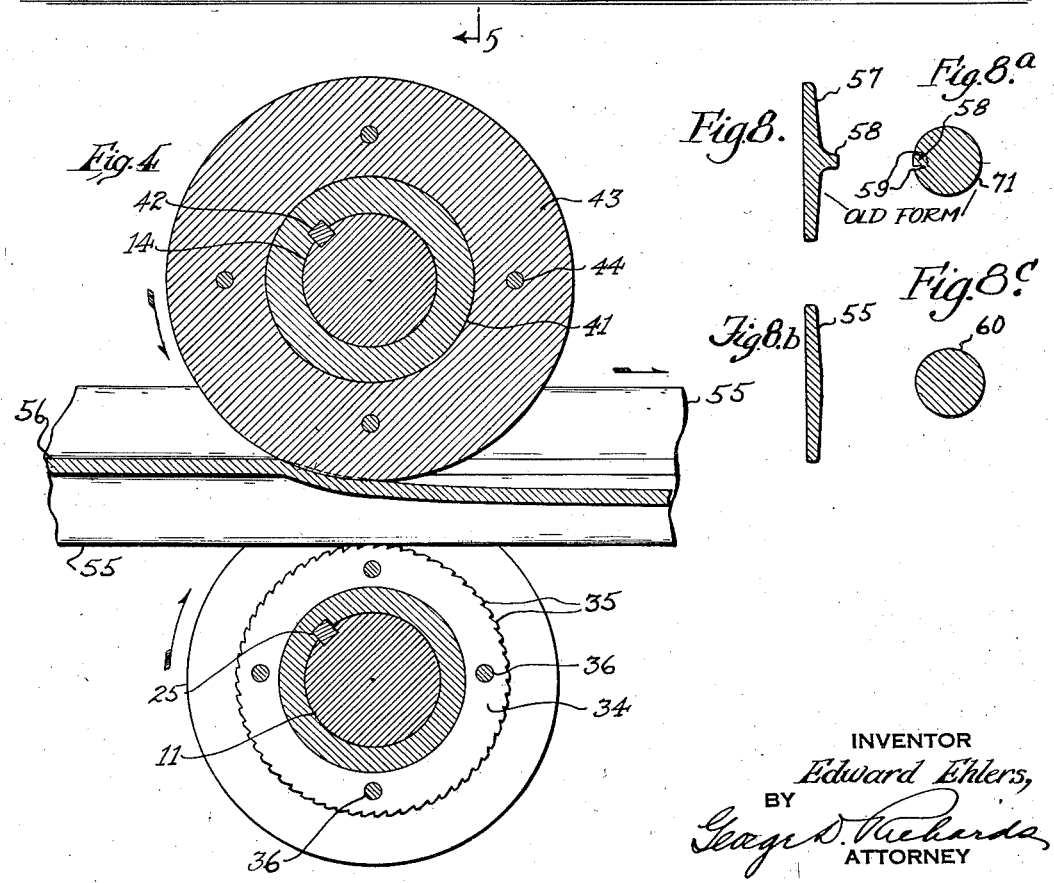
INVENTOR
Edward Ehlers,
BY
George D. Richards
ATTORNEY Oct. 30, 1934.  E. EHLERS  1,978,703
SLITTER
Filed Feb. 1, 1933  3 Sheets-Sheet 3
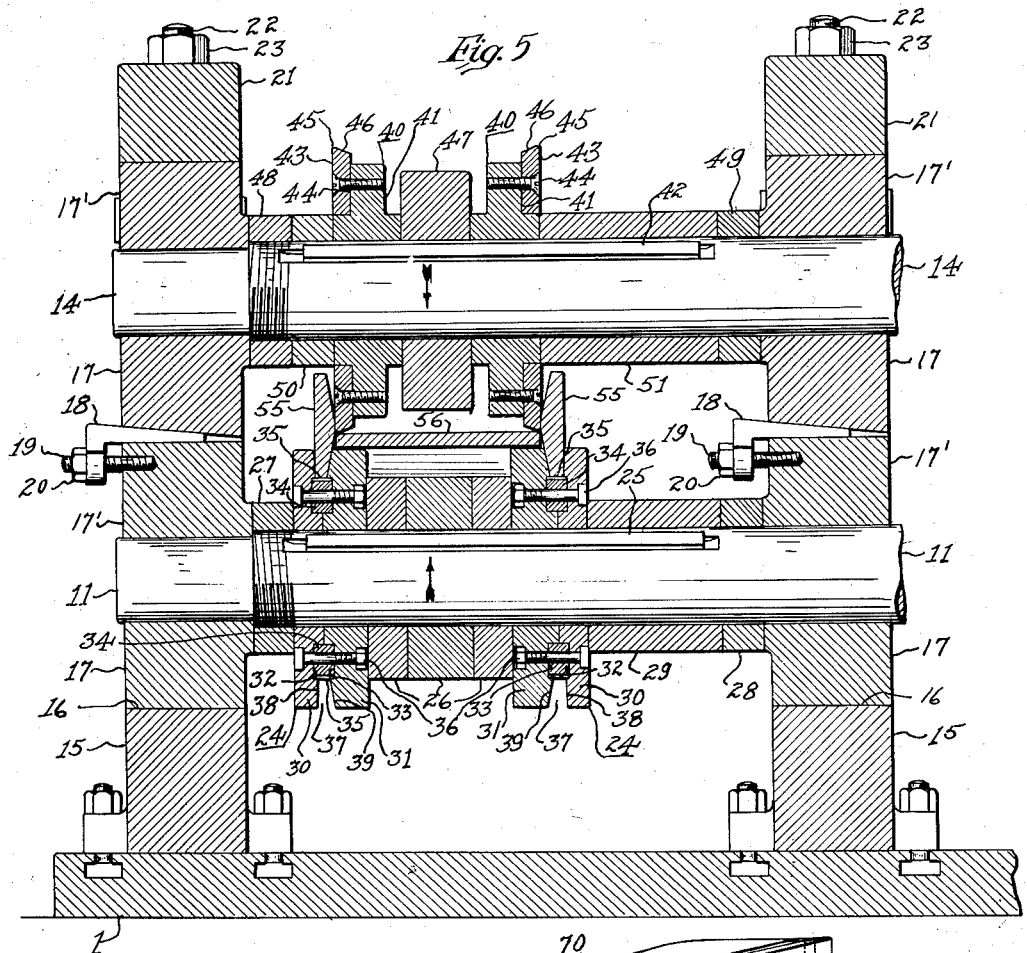
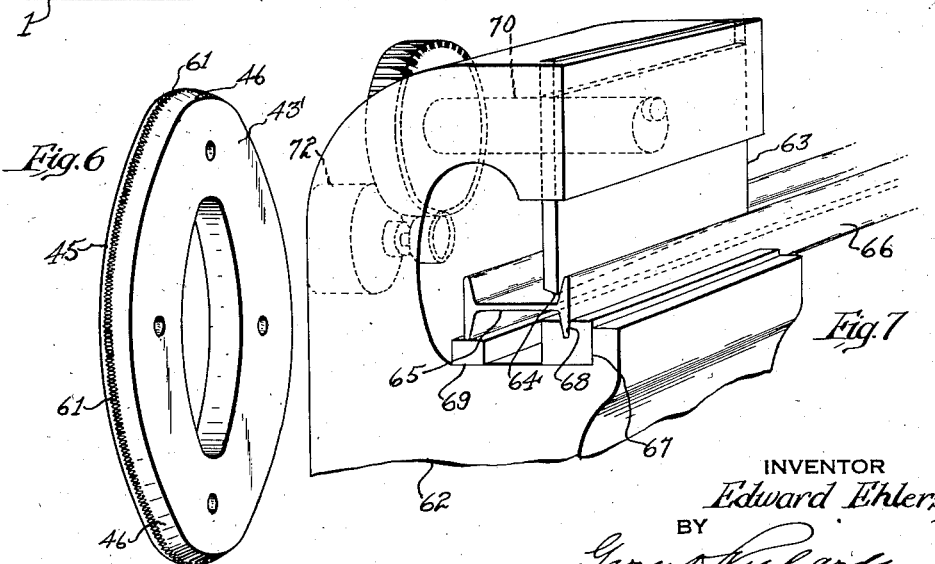
INVENTOR
Edward Ehlers,
BY
George S. Richards
ATTORNEY Patented Oct. 30, 1934

1,978,703

UNITED STATES PATENT OFFICE 1,978,703

SLITTER

Edward Ehlers, Montclair, N. J.

Application February 1, 1933, Serial No. 654,573

4 Claims. (Cl. 164—60)

This invention relates, generally, to the slitting or shearing of steel or other metal members and structural shapes; and the invention has reference more particularly, to a novel slitter or shearing machine especially adapted for slitting or shearing I-beams at the lines of juncture of the web of the I-beam with the flange thereof.

Much scrap steel and other used structural material is cut up and rolled into new shapes which can be sold as new stock. Heretofore, in cutting up I-beams for the purpose of rolling them into new stock, rotary shears or slitters have been used at times in carrying out the shearing operation. One rotary shear is set opposite and slightly offset from a cooperating rotary shear so that the cutting edges of the rotary shears will lie in a common plane with the bodies of these rotary shears lying on the opposite sides of this plane. When using such rotary shears, it is impossible to cut the web of an I-beam off close to the flange thereof, so that when using such rotary shears, there is always a stub projection or portion of the web left on each of the I-beam flanges, which portion of the web is substantially equal in height to the thickness of one of the rotary shear blades. When the I-beam flanges are later rolled down into round shape, for example, the remaining stub or ridge projection of the I-beam web on the flange is pressed into the body of the flange, forming two fissures or cracks, one at each side of the former portion of the I-beam web, which fissures or cracks are highly objectionable because, when such round stock is threaded for example, the threads will break off in the region of these fissures, thereby rendering the stock worthless.

The principal object of the present invention is to provide a novel slitter or shearing machine which is adapted to slit or shear I-beams or similar beams at the lines of juncture of the web of each beam with the flanges thereof, thereby eliminating the web stub projection heretofore left on I-beam flanges on shearing the flanges from the web, the flanges being substantially flat and adapted to be readily rolled into any desired shape without the formation of fissures or cracks.

Another object of the present invention lies in the provision of a novel slitter or shearing machine of the above character having guide roll means for properly guiding the I-beam or other beam in its passage through the machine, whereby the I-beam will be sheared accurately along the lines of juncture of the web with its flanges, thereby producing a neat and uniform product and preventing injury to the machine.

Still another object of the present invention is to provide a novel slitter or shearing machine which is of simple, rugged construction and is exceedingly dependable in use.

Other objects of this invention, not at this time more particularly enumerated, will be clearly understood from the following detailed description of the same.

The invention is clearly illustrated in the accompanying drawings, in which:

Fig. 3 is a view in side elevation of the structure shown in Fig. 2.

Fig. 4 is an enlarged fragmentary sectional view taken substantially along line 4—4 of Fig. 1 looking in the direction of the arrows.

Fig. 5 is an enlarged sectional view taken substantially along line 5—5 of Fig. 3.

Fig. 6 is a perspective view of a slightly modified form of rotary cutter.

Fig. 7 is a perspective view of a straight shear arrangement employed for accomplishing the purposes of the present invention; and Fig. 8 is a sectional view of an I-beam flange heretofore produced.

Fig. 8a is a sectional view of the rolled product formed from the flange of Fig. 8.

Fig. 8b is a sectional view of an I-beam flange produced by the machine of this invention; and Fig. 8c is a sectional view of the rolled product formed from the flange of Fig. 8b.

Similar characters of reference are employed in all of the above described views to indicate corresponding parts.

Figure 1:
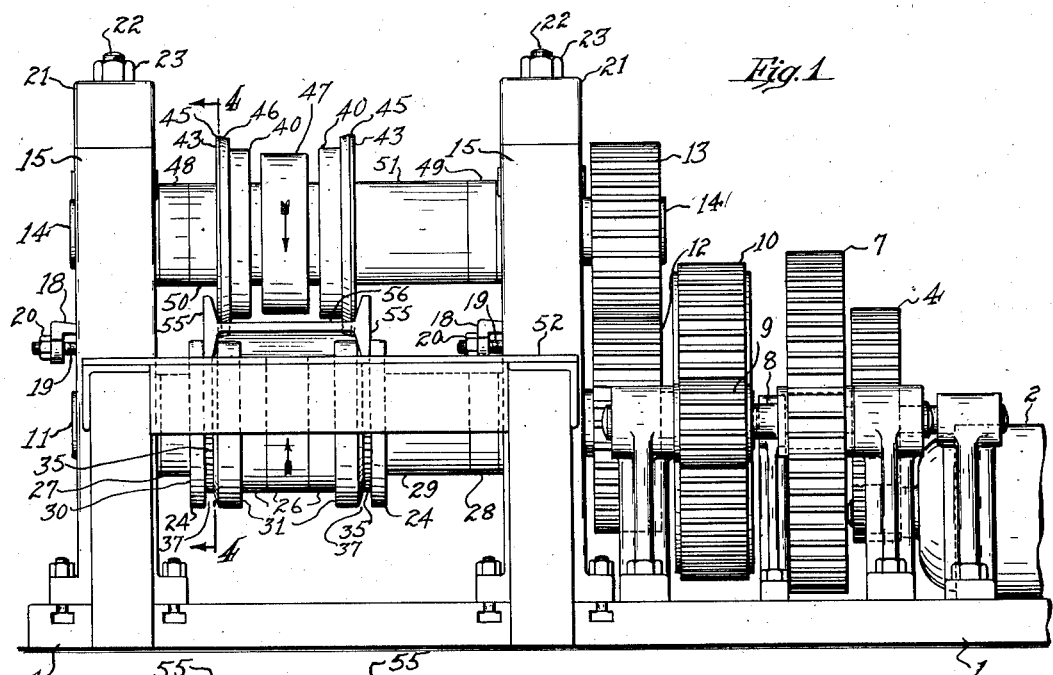
Fig. 1 is a view in front elevation showing the novel slitter of the present invention operating upon an I-beam.
Figure 2:
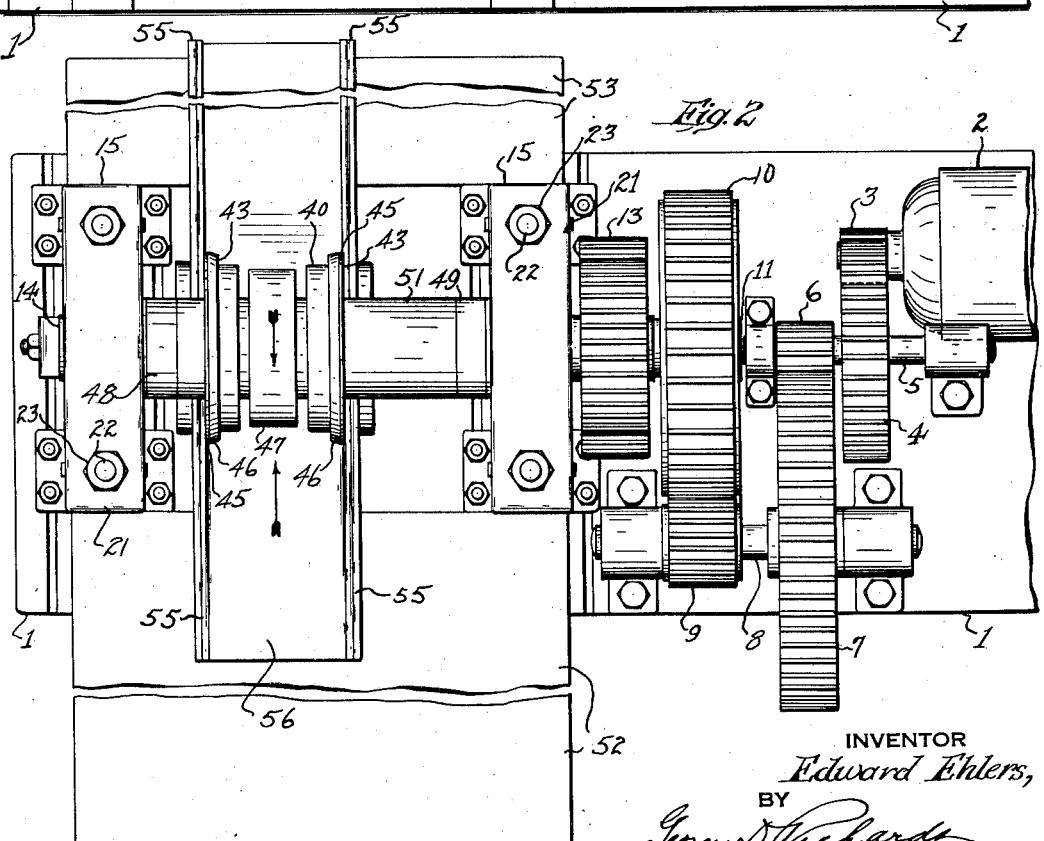
Fig. 2 is a plan view with parts broken away of the structure shown in Fig. 1.

Referring now to Figs. 1 to 5 of the said drawings, the reference numeral 1 designates the bed or base of the novel slitter or shearing machine of the present invention. Mounted on the base 1 is an electric motor 2 having a driving pinion 3 driving a reduction gear 4 which is fixed on a shaft 5 carrying a pinion 6 that in turn drives a reduction gear 7. Reduction gear 7 is fixed on a shaft 8 having a pinion 9 which drives a king gear 10, which latter gear is fixed upon a guide roll shaft 11. A gear 12 is fixed on the guide roll shaft 11 in tandem with the king gear 10 and meshes with another gear 13 that is fixed upon a rotary cutter shaft 14. The guide roll shaft 12 and the cutter shaft 14 are mounted in bearings provided in upright standards 15.

Each of the standards 15 has a rectangular recess 16 therewithin (see especially Fig. 3) within which recess is mounted two bearings, each of which bearings consists of lower and upper bearing block halves 17 and 17'. Bearing halves 17 and 17' support the guide roll shaft and the cutter shaft upon the standards 15. The cutter shaft 14 may be raised or lowered somewhat with respect to the guide roll shaft 11 by means of wedges 18 which are interposed between the upper bearing block halves 17' supporting the guide roll shaft and the lower bearing blocks halves 17 supporting the cutter shaft 14. Studs 19 are threaded into the upper bearing block halves 17' supporting the guide roll shaft and have nuts 20 thereon for engaging and moving the wedges 18. The standards 15 are provided with bearing caps 21 which are retained in place by studs 22 and nuts 23.

The guide roll shaft 11 has guide rolls designated as a whole by the reference numeral 24 fixed thereon as by a key 25 extending intermediate the standards 15. The guide rolls 24 are adapted to be suitably spaced apart along the shaft 11 by means of spacing collars 26 which may be of various widths depending upon the depth of the I-beams to be cut by the machine at any time. A collar 27 is threaded upon guide roll shaft 11 with a right hand thread and is located intermediate the lower bearing 17, 17' of the left hand standard 15 and the left guide roll 24. Another collar 28 is shrunk or otherwise secured upon guide roll shaft 11 adjacent the lower bearing 17, 17' of the right hand standard 15. A spacing collar 29 extends between the collar 28 and the right hand guide roll 24. Collars 27, 28 and 29 serve to retain the guide roll assembly in proper longitudinal position upon the guide roll shaft 11.

Each of the guide rolls 24 comprises opposed cooperating discs or collars 30 and 31 which are keyed upon the shaft 11 by the key 25. The opposed faces of discs 30 and 31 are formed with cooperating annular recesses 32 and 33, respectively, within which recesses is secured an annular driving ring member 34. The driving ring member 34 is preferably made of hardened material, such as hardened steel and has its peripheral surface provided with a plurality of transverse serrations or teeth 35 (see especially Fig. 4) to enhance the grip of this driving ring upon the flange edge of the I-beam.

Bolts 36, extending through aligned apertures in the discs 30 and 31 and in the driving ring 34, serve to secure these members rigidly together to form each complete guide roll. Radially outwardly of the driving ring 34, the discs 30 and 31 are cut away to provide an annular space 37 for conformably receiving the I-beam flange. The annular surface 38 of the disc 30, forming one side wall of the annular space 37, is preferably inclined about one degree with respect to a vertical plane so as to readily receive and cooperate with the outer surface of the I-beam flange. The annular surface 39 of the disc 31, forming the other side wall of the annular space 37, is inclined approximately ten degrees with the vertical in order to conformably receive the inner inclined surface of the I-beam flange.

The rotary cutter shaft 14 is illustrated as carrying two rotary cutters or slitters 40, comprising hubs 41 which are keyed upon the shaft 14 as by a key 42. Hubs 41 have annular recesses in the sides thereof for receiving annular cutting blades 43 which are secured to the hubs 41 as by screws 44. The peripheral edge portion of each of the cutting blades 43 is formed with a relatively short cylindrical cutting edge portion 45 and a somewhat tapered portion 46 which merges at one end into the cutting edge portion 45 and has its other end terminated by the inner side wall of the cutting blade.

A spacing collar 47 is illustrated as interposed between the two rotary cutters 40, the said spacing collar serving to position the cutting edge portions 45 of the rotary cutters 40 a distance apart substantially equal to the height of the web of the I-beam handled by the machine. As different depths of beams are handled by the machine, different widths of collars 47 or more than one such collar will be used to properly space the rotary cutters along the shaft 14. A collar 48 is threaded with a left hand thread upon shaft 14 adjacent the upper bearing 17, 17' of the left hand standard shown in Fig. 5, whereas another collar 49 is shrunk or otherwise fixed upon the shaft 14 adjacent the upper bearing 17, 17' of the right hand standard 15 shown in Fig. 5. Spacing collars 50 and 51 are interposed between collar 48 and one rotary cutter and collar 49 and the other rotary cutter, respectively. Collars 48 and 49 and the spacing collars 50 and 51 serve to retain the rotary cutter assembly in proper longitudinal position upon the shaft 14.

In use, the motor 2 drives through reduction gearing 3, 4, 6, 7, 9, and 10 to the guide roll shaft 11, thereby rotating this guide roll shaft and serving, by rotating gears 12 and 13, to also rotate the cutter shaft 14 in the opposite direction to the direction of rotation of guide roll shaft 11. A table 52 is provided at the front of the machine for supporting the I-beams as they are advanced into the machine. A similar table 53 is provided at the rear of the machine for receiving the cut-up I-beams after they leave the machine. The tops of tables 52 and 53 are substantially level with the tops of the driving rings 34.

In order to sever the web from the flanges 55 of an I-beam 56, the I-beam is advanced longitudinally over the table 52 as by means of an overhead crane so that the flanges 55 at the forward end of the I-beam, enter the annular spaces 37 provided therefor within the guide rolls 24. As soon as the I-beam flanges 55 enter these annular spaces 37, the lower edges of these flanges are gripped by the teeth 35 of the driving rings 34, which teeth act to advance the I-beam through the machine. At the same time that the teeth 35 grip the lower edge of the I-beam flanges 55, the cutting blades 43 of the rotary cutters 40, commence to shear the web of the I-beam along the lines of juncture of this web with the I-beam flanges, which action is especially shown in Figs. 4 and 5. The turning of the cutting blades 43 also aids in advancing the beam 56 through the machine. The cutting edge portions 45 of the cutting blades 43 preferably project slightly below the lower surface of the beam web so that this web is completely severed by the rotary cutters as the I-beam advances. In practice, it has been found that a satisfactory speed of movement of the I-beam through the machine is twenty-five feet per minute.

After passing under the cutting blades 43, the severed I-beam moves onto the table 53 and may be withdrawn by means of a crane or other suitable conveying means. After the shearing operation, the web of the I-beam is completely severed from the flanges thereof, the line of severance extending along the lines of juncture of the web with the flanges. The I beam is thus cut up into three substantially rectangular pieces, the two flanges 55 and the web, which pieces may be readily rolled down into any desired shape, such as round or square bars.

In Fig. 8, the reference numeral 57 designates an I-beam flange, such as formed by shearing machines heretofore used. These machines always left a portion 58 of the I-beam web remaining on the flange 57 so that when this flange is rolled down into the circular shape or rod 71, for example, see Fig. 8a, fissures 59 are formed adjacent what was originally the web portion 58. Hence, in the event that the rod 71 is threaded, the thread is very apt to break off in the region between the fissures 59, causing such stock to be useless. By employing the machine of the present invention, the I-beam web is completely moved from the flange as illustrated in Fig. 8b, so that when this flange 55 is rolled down into the round shape 60, for example, see Fig. 8c, the bar will be perfect and without fissures.

In some instances it is desirable to enhance the grip of the annular cutting blades 43 upon the web of the I-beam so that the traction of these cutting blades upon the I-beam will be increased, thereby causing these cutting blades to more readily assist in moving the I-beam through the machine. A slightly modified form of cutting blade 43' which is adapted to exert increased traction on the I-beam, is illustrated in Fig. 6. In this figure, the cutting blade shown is illustrated as provided with a plurality of consecutive transverse serrations 61 disposed along the circumferential line of juncture between the cutting edge portion 45 and the tapered portion 46 of the blade. In use, the serrations 61 enhance the grip of the cutting blade 43' upon the web of the I-beam, thereby greatly assisting the driving ring 34 of the guide rolls 24 in moving the I-beam through the machine.

The principles of the present invention may be applied to machines having straight shear blades as well as to machines having rotary shear blades. The application of the invention to a straight shear blade machine is illustrated in Fig. 7, wherein the shearing machine 62 shown has a vertical reciprocating shear blade 63. The lower cutting edge 64 of the shear blade 63 is shown as canted. The I-beam 65 is illustrated as having one flange 66 thereof mounted upon a supporting block or member 67 which has a longitudinal recess 68 therein for conformably receiving the lower portion of the flange 66. The I-beam 65 is so positioned with respect to the shear blade 63, that when this shear blade moves downwardly, it will shear the web of the I-beam along the line of juncture of this web with the flange 66. The other flange of the I-beam is supported upon a block 69 during this operation. The shear blade 63 is adapted to be reciprocated by means of an eccentric mounted on a shaft 70 driven from a motor 72 in the usual manner. After each downward movement of the shear blade 63, the I-beam is advanced a distance equal to the length of the shear blade. After shearing one side of the web, the beam is turned around and the other side of the web is sheared from the remaining flange of the beam.

It will be apparent that when using the machine shown in Figs. 1 to 6, various sizes of I-beams or similar beams might be cut by adjusting the wedges 18, thereby providing for differences in the widths of the beams, and by varying the spacing of the cutters 40 and guide rolls 24, thereby providing for differences in the depths of the beams.

I am aware that various changes could be made in the above described constructions, and many apparently widely different embodiments of this invention could be made without departing from the scope thereof; it is therefore intended that all matter contained in the above description or shown in the accompanying drawings shall be interpreted as illustrative and not in a limiting sense.

I claim:—

1. In a slitter of the character described, a cutting blade having a cutting edge in the plane of one side thereof, supporting means having a recess therein provided with a straight side and a tapered side for conformably receiving and supporting both sides of the flange of a beam, said supporting means serving to position the beam so that this beam is engaged by said cutting blade edge at the juncture of the flange with the web of the beam, and means for actuating said cutting blade so that the latter slits the beam along the line of juncture of the web with the flange thereof, the straight and tapered sides of said supporting means by snugly engaging both sides of the beam flange, serving to prevent distortion of said beam under the pressure of said cutting blade, whereby no portion of the severed beam web is left adhering to the flange.

2. In a slitter of the character described, a frame, spaced parallel shafts carried by said frame, a rotary cutter mounted upon one of said shafts to turn therewith, a guide roll mounted upon the other of said shafts to turn therewith, said guide roll having a receiving recess therein, one side of said recess being substantially straight and the other side inclined for receiving and guiding the flange of an I-beam and for positioning and rigidly holding the I-beam so that said cutter will sever the flange from the web of the beam, said receiving recess having teeth provided therewithin for gripping the I-beam flange, and motive means for rotating said parallel shafts, whereby said guide roll turns and moves the I-beam against said rotary cutter, the pressure of the cutter during the cutting operation serving to enhance the grip of said guide roll teeth upon the flange of the beam while said receiving recess prevents the distortion of the beam, said rotary cutter having circumferentially disposed serrations in the peripheral surface thereof for gripping the I-beam to assist in moving this beam.

3. In a shearing machine, a vertically movable shear blade, a supporting member having a longitudinally extending recess therein for receiving the flange of a beam, said supporting member serving to position the beam so that this beam is engaged by said shear blade at the juncture of the flange with the web of the beam, and power transmission means for reciprocating said blade so that the latter slits the beam along the line of juncture of the web with the flange thereof.

4. In a shearing machine, a vertically movable shear blade, a supporting block having a longitudinally extending groove therein for conformably receiving one flange of a beam, means for supporting the other flange of the beam, said supporting block serving to position the beam so that said shear blade engages the beam at the juncture of its first named flange with the web thereof, and means for reciprocating said shear blade, whereby said blade is caused to slit the beam along the line of juncture of the web with the first named flange thereof.

EDWARD EHLERS.